Feb. 7, 1961  K. J. DAVIS  2,970,408
GEAR FINISHING MACHINE
Filed March 17, 1958  2 Sheets-Sheet 1

INVENTOR.
KENNETH J. DAVIS
BY Whittemore
Hulbert & Belknap
ATTORNEYS

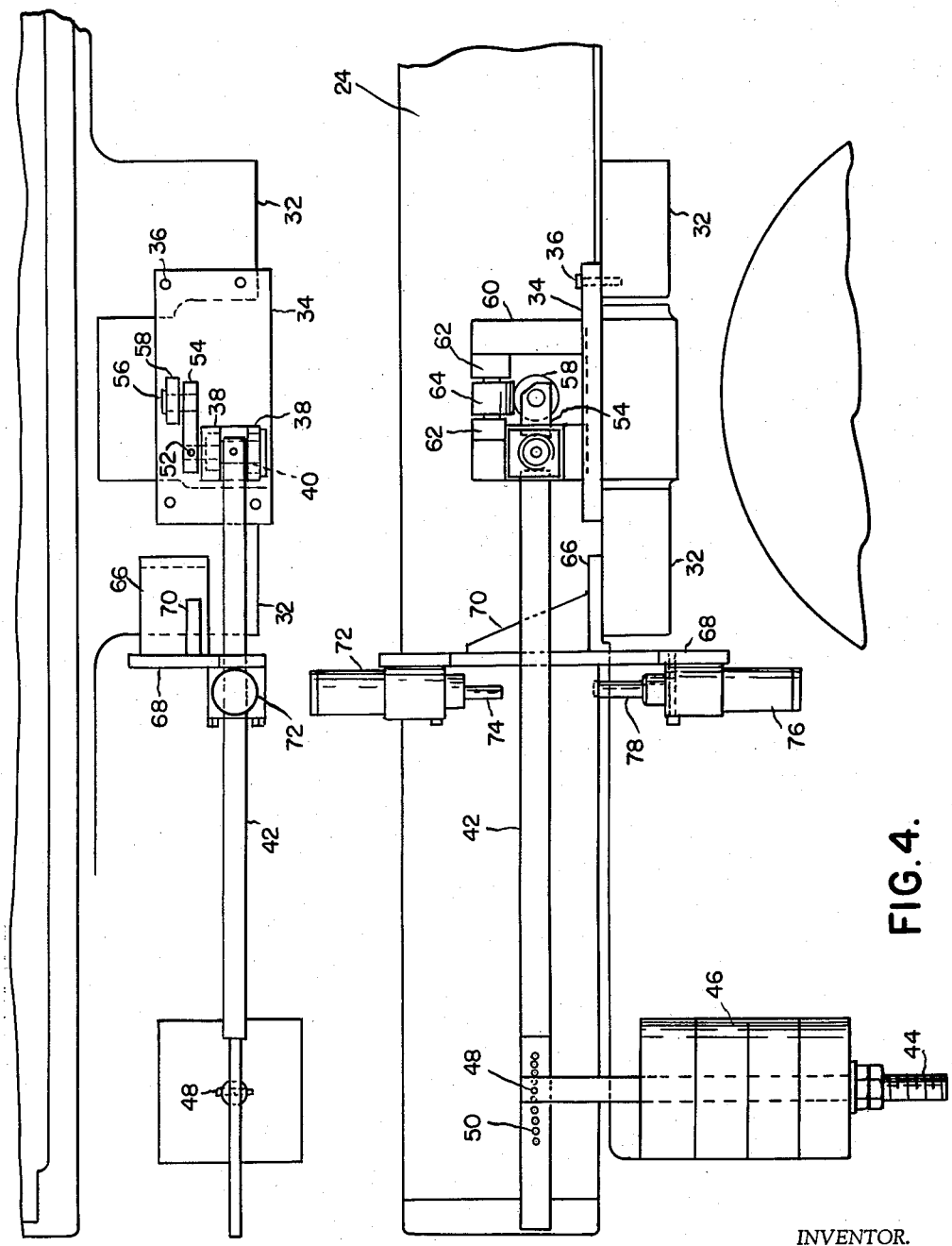

United States Patent Office 2,970,408
Patented Feb. 7, 1961

2,970,408

GEAR FINISHING MACHINE

Kenneth J. Davis, Detroit, Mich., assignor to National Broach & Machine Company, Detroit, Mich., a corporation of Michigan Filed Mar. 17, 1958, Ser. No. 721,914

9 Claims. (Cl. 51—71)

The present invention relates to a gear finishing machine, and more particularly to such a machine designed for use in a gear honing operation.

It is an object of the present invention to provide a gear finishing machine characterized by means for supporting a gear and a gear-like tool such as a hone in mesh, one of said means being movable toward and away from the other, together with counter-balance means for controlling the pressure of engagement between a gear and gear-like tool carried by said means.

More specifically, it is an object of the present invention to provide a gear finishing machine comprising a work gear support, a tool support, means for driving one of said supports in rotation, means for effecting relative traverse between said supports in a plane parallel to the axis of both of said supports, one of said supports including a pivoted platform, and counterbalance means associated therewith to provide a controlled relatively light pressure between a gear and gear-like tool carried said supports.

It is a further object of the present invention to provide a machine as described in the preceding paragraph in combination with motor means effective to move said platform to effect movement of a gear or tool carried thereby toward and away from a tool or gear carried by the machine.

Other objects and features of the invention will become apparent as the description proceeds, especially when taken in conjunction with the accompanying drawings, illustrating a preferred embodiment of the invention, wherein:

Figure 3 is a fragmentary enlarged plan view of the work support platform and counterbalance mechanism.

Figure 4 is a fragmentary enlarged front elevational view of the work support platform and counterbalance mechanism.

The present machine was designed primarily for use as a gear honing machine. Gear honing is an operation performed by rotating a work gear, such for example as a hardened steel gear, in mesh with a gear-like hone conjugate to the work gear. The honing tool has tooth portions formed of a suitable plastic material such as an epoxy resin compound having separate abrasive grains embedded therein, some of the grains being exposed in the tooth surfaces of the hone. The hone is relatively hard so that the form of its teeth is maintained, but is slightly yieldable and highly resilient. It is thus enabled to withstand the cramping action and stresses incident to rotation of a gear with a work gear.

It has been found that the honing operation may be best controlled by a control of the radial pressure existing between the rotating gear and hone as the parts are rotated in mesh and preferably given a relative traverse, as for example in a direction parallel to the axis of the gear.

Figure 1:
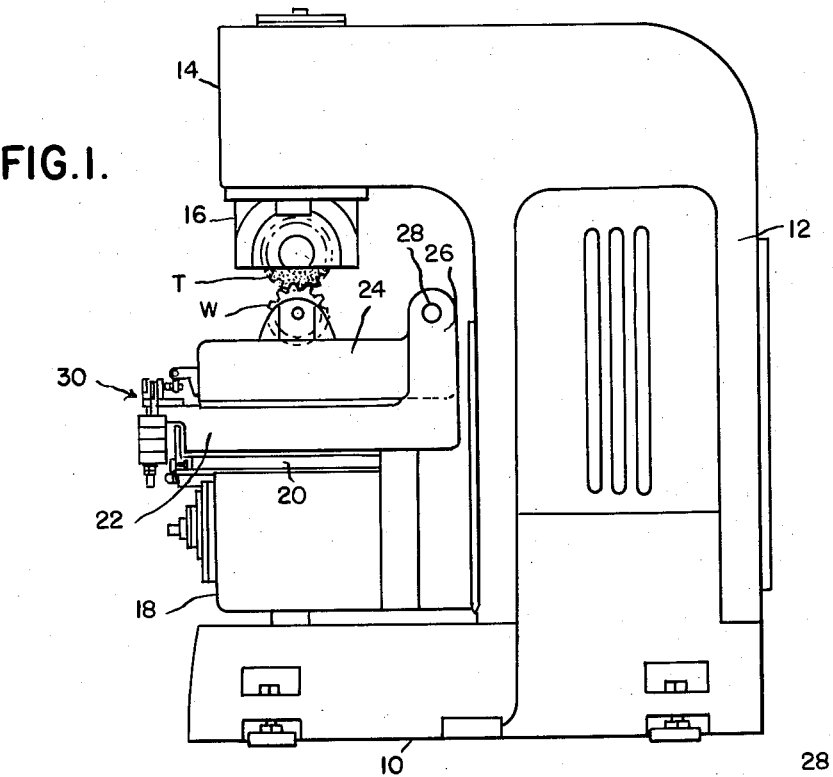
Figure 1 is a side elevation of a gear finishing machine constructed in accordance with the present invention.

Referring now to Figure 1 there is shown a machine comprising a base 10 having a vertically extending column 12 terminating in an overhanging head 14 which contains a motor (not shown) adapted to drive a gear-like tool T. The tool T is carried by a tool support 16 which is adjustable angularly about a vertical axis so that it may be meshed with a work gear W with the axes of the gear and tool parallel if desired but preferably at a limited crossed axis.

Extending upwardly from the base 10 is a knee 18 which is vertically adjustable so as to accommodate work gears and tools of different size. Mounted on the knee 18 is a sub-table 20. Suitable ways are provided between the knee and sub-table to provide for reciprocation of the sub-table as for example in a direction parallel to the axis of the work gear as seen in Figure 1. Mounted on the sub-table or slide 20 is an intermediate or crowning table 22 which is preferably connected to the sub-table for rocking movement about a horizontal axis extending perpendicular to the direction of traverse of the sub-table and preferably located directly beneath the work gear W. Mounted on the intermediate table 22 is a tilt table 24. The intermediate table 22 is provided with upstanding arms 26 located at the rear side of the tilt table 24 and forming a trunnion connection by means of pivots 28 for the tilt table. It will be noted that the axis of the pivot mounting 28 is in substantially the same horizontal plane as the axis of the work piece W so that the relatively small rocking movement of the tilt table contemplated herein results in a movement of the work gear which is essentially vertical.

Figure 2:
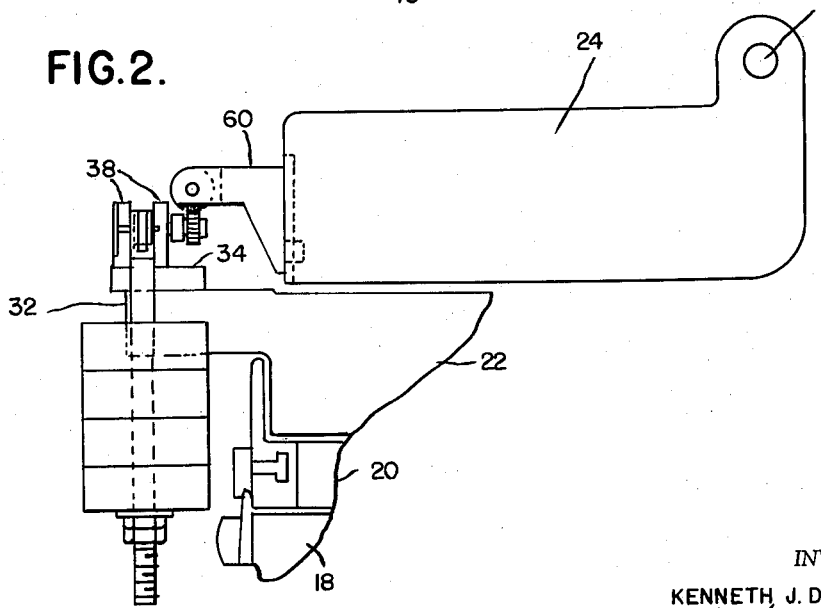
Figure 2 is a fragmentary enlarged side view of the pivoted work support platform and counterbalance mechanism.

Counterbalance means indicated generally at 30, which is illustrated in more detail in Figures 2-4, is provided and supports the weight of the tilt table 24 and provides a slight excess of force to cause the work gear to be pressed upwardly against the tool T with a controlled relatively light radial pressure.

In the gear finishing operation the counterbalance means is adjusted to produce the required radial pressure between the tool and work gear and the tool is driven in rotation at substantial speeds while the sub-table is traversed horizontally to extend the finishing action from end to end of the teeth of the work gear.

Referring now to Figures 2-4 the counterbalance mechanism comprises a pair of mounting extensions 32 which extend forwardly from the intermediate table 22, spanned by a plate 34 bolted to the extensions as indicated at 36. Mounted on the plate 34 are a pair of ears 38 forming a trunnion mounting for a pin 40 to which an elongated counterbalance arm 42 is fixedly secured. At its outer end the counterbalance arm 42 has a depending counterweight support 44 carrying a series of counterweights indicated at 46. The support 44 is connected by a pin 48 to a selected one of a series of longitudinally spaced pin receiving openings 50 to vary the effectiveness of the counterbalance.

The pin 40 extends inwardly of the machine beyond the inner ear 38 where it is pinned or otherwise fixed as indicated at 52 to a short arm 54 having a pin 56 carrying a roller 58 secured thereto. As seen in Figures 2 and 4, means are provided on the tilt table 24 for engaging the roller 58, these means being omitted from Figure 3 for clarity. The means comprises a mounting bracket 60 which is fixedly secured to the forward edge of the tilt table 24 and which has a pair of spaced ears 62 between which is mounted a roller 64 engageable with the roller 58.

As a result of the foregoing arrangement it will be observed that the effective arm producing a lifting effort on the roller 64 is variable at the same rate as the loading arm extending from the pivot pin 40 to the weight 46. Accordingly, as the lever 42 swings, the ratio between its effective loading and actuating arms remains constant. It will further be observed that this relationship would be preserved even though the roller 58 engaged beneath a flat surface instead of the roller 64. In either case, the surface with which the roller 58 is engaged would be composed of rectilinear elements extending transversely to the axis of the roller 58.

From the description as thus far completed it will be observed that the counterbalance weights 46 operate through the counterbalance arm or lever 42 and the arm 54 to provide an upward force on the roller 64. This force may be controlled and is sufficient to over-balance the torque resulting from the weight of the tilt table 24 and to provide a relatively small upward force to produce a controlled radial pressure between the tool T and the work piece W.

Mounted on the left hand extension 32 is a bracket comprising a horizontal plate 66 welded or otherwise secured to a vertical plate 68 and reinforced by a gusset plate 70. Carried by the plate 68 above the lever 42 is an air cylinder 72 having a piston therein connected to an actuating plunger 74 effective to swing the lever 42 downwardly so as to raise the tilt table 24. At the lower end of the plate 68 is a second air cylinder 76 having a piston therein connected to a plunger 78 operable to engage beneath the lever 42 and to effect downward movement of the tilt table 24.

It will be understood that air is supplied to the cylinders 72 and 76 to control movement of the tilt table during loading and unloading. During the honing cycle the plungers 74 and 78 are in the retracted position illustrated in Figure 4 so as to leave the lever 42 to swing. Accordingly, the pressure between the gear and the tool will be controlled solely by the torque developed by the counterbalance weights 46. Upon completion of the honing cycle air will be admitted to the cylinder 76 to rock the lever 42 upwardly so as to permit downward movement of the tilt table to a position introducing clearance between the work piece W and the honing tool T. After a gear has been loaded on the work support on the tilt table 24, air is released from the cylinder 76 to permit the counterbalance weights to move the tilt table in a direction to engage the teeth of the work gear and honing tool. This movement may be assisted by the plunger 74.

It may be noted that while the counterbalance is normally adjusted so as to apply only a few pounds of total pressure between the gear and tool, nevertheless the tilt table as a whole is of very considerable mass. Accordingly, the inertia of the tilt table prevents rapid fluctuation thereof which might be induced by eccentricity in a work gear so that while the tilt table is permitted to float, in contrast to being locked up rigidly with a predetermined radial spacing between the work gear and tool, nevertheless due to inertia the machine is effective to correct eccentricity in a work gear to a large degree.

The drawings and the foregoing specification constitute a description of the improved gear finishing machine in such full, clear, concise and exact terms as to enable any person skilled in the art to practice the invention, the scope of which is indicated by the appended claims.

What I claim as my invention is:

1. A gear finishing machine comprising a frame, a work support member on said frame, a tool support member on said frame, means mounting one of said members for swinging movement on said frame substantially radially toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and directly engageable with said movable member and a loading arm extending from the pivot axis to said weight, the effective length of the loading and actuating arms of said lever and the distance from the axis of swinging movement of said movable support member to the point of engagement with said actuating arm being variable to maintain a substantially constant force between work and tool elements carried by said support members during movement of said lever.

2. A gear finishing machine comprising a frame, a work support member on said frame, a tool support member on said frame, means mounting one of said members below said other member for vertical swinging movement on said frame toward and away from said other member, motive means connected between said frame and said movable member effective to urge said movable member toward said other member with a constant controlled force, said motor means comprising a lever mounted on said frame for locking movement about a horizontal pivot axis, a weight on said lever, said lever having an actuating arm extending from its pivot axis and operatively connected to said movable member and a loading arm extending from the pivot axis to said weight, and power means acting between said frame and said lever and operable to raise the loading arm of said lever to move said movable support member downwardly away from said other support member.

3. A gear finishing machine comprising a frame, a work support member on said frame, a tool support member on said frame, means mounting one of said members below said other member for vertical swinging movement on said frame toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, and power means acting between said frame and said lever and operable to depress the loading arm of said lever to move said movable support member upwardly toward said other support.

4. A gear finishing machine comprising a frame, a work support member on said frame, a tool support member on said frame, means mounting one of said members below said other member for vertical swinging movement on said frame toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, and power means acting between said support and said lever operable to control swinging movement of said lever in both directions.

5. A gear finishing machine comprising a frame, a work support member on said frame, a tool support member on said frame, means mounting one of said members below said other member for vertical swinging movement on said frame toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, and power means acting between said support and lever operable to raise the loading arm of said lever to provide for downward swinging of said movable member by gravity and to provide for controlled downward movement of the loading arm of said lever by gravity.

6. A gear finishing machine comprising a frame, a work support member on said frame, a tool support member on said frame, means mounting one of said members below said other member for vertical swinging movement on said frame toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, and power means acting between said support and said lever operable to oppose downward swinging of the loading arm of said lever by gravity so as to control upward movement of said movable support member.

7. A gear finishing machine comprising a frame, a work support member on said frame, a tool support member on said frame, means mounting one of said members for movement on said frame toward and away from said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, movable power means having a one-way connection with said lever and effective to swing said lever in a direction to elevate its loading arm to provide for separation between said support members and to control downward movement of the loading arm of said lever by gravity so as to control approach between said support members.

8. A gear finishing machine comprising a frame, a work support member on said frame, a tool support member on said frame, means mounting one of said members for pivotal movement on said frame to move a gear-like element carried thereby generally radially toward and away from a gear-like element carried by said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, a roller carried at the free end of said actuating arm and engageable with a surface on said movable support member having rectilinear surface elements extending transversely to the axis of said roller.

9. A gear finishing machine comprising a frame, a work support member on said frame, a tool support member on said frame, means mounting one of said members for pivotal movement on said frame to move a gear-like element carried thereby generally radially toward and away from a gear-like element carried by said other member, motive means connected between said frame and said movable member effective to urge said movable member toward said other member with a constant controlled force, said motive means comprising a lever mounted on said frame for rocking movement about a horizontal pivot axis, a weight on said lever, said lever having an actuating arm extending from its pivot axis and operatively connected to said movable member and a loading arm extending from the pivot axis to said weight, a first roller carried by said movable support member, a second roller carried at the free end of the actuating arm of said lever and engaging said first roller, the axis of said second roller being parallel to the pivot axis of said lever, the axis of said first roller extending transversely to the axis of said second roller.

References Cited in the file of this patent

UNITED STATES PATENTS

| | | |
|---|---|---|
| 1,960,841 | Fellows | May 29, 1934 |
| 2,060,803 | Falk | Nov. 17, 1936 |
| 2,613,486 | Praeg | Oct. 14, 1952 |